Aug. 2, 1966   E. C. BOWER   3,263,595
GRILL BOARD
Filed Feb. 20, 1964
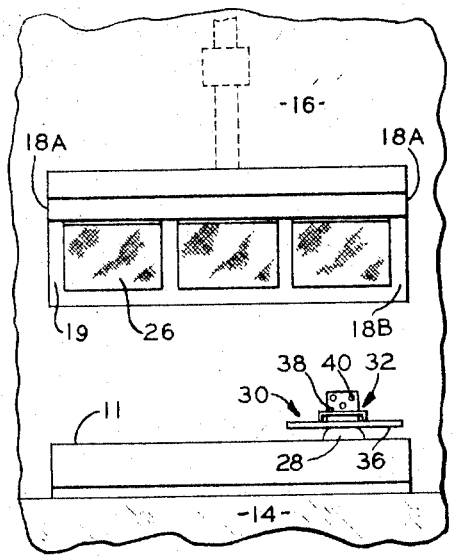
FIG. 1
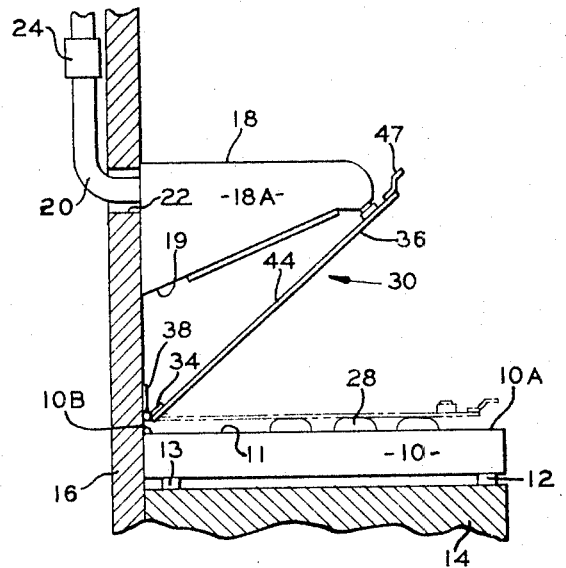
FIG. 2
FIG. 3
FIG. 4
FIG. 5
FIG. 6
INVENTOR
EDWIN C. BOWER
BY
*Harold D. Shell*
ATTORNEY

United States Patent Office 3,263,595
Patented August 2, 1966

3,263,595
GRILL BOARD
Edwin C. Bower, 7710 Seneca Trail, Temperance, Mich.
Filed Feb. 20, 1964, Ser. No. 346,255
1 Claim. (Cl. 99—349)

This invention relates to cooking utensils in general and more particularly to a grill board for use in conjunction with a grill having a vapor disposing hood cooperatively situated therewith.

Cooking utensils in the form of grill boards have found wide spread use when, for example, it is desired to pressingly secure an item on the grill such as a bun, slice of bread or sandwich which is desired to be heated for toasting and the like. However, such prior art grill boards are deficient in their operation since they must be manually removed from the grill for storage, cleaning, and when items are removed and placed thereunder.

A particular deficiency arises in toasting operations, since during such operation, the item being toasted on the grill discharges substantial amounts of water vapor. This vapor tends to condense on the lower surface of the grill board so that when the toasted item is removed, it is necessary to thoroughly wipe the grill board before placing a new item on the grill and under the board, since if not removed, the condensed vapor would otherwise be deposited on the new item thereby making it soggy.

It has been noted that, with these prior art grill boards, the usual operator grasps the grill board, removes it from the toasted item and wipes the bottom thereof on his uniform or a wiping cloth such as a towel secured about his waist, or on a wiping cloth lying aside the grill. Not only is such an operation time consuming and wasteful in its use of a substantial quantity of wiping material, but additionally, it is somewhat unsanitary unless the uniform or wiping cloth is changed regularly. Further, the operator quite frequently drops the grill board on the floor thereby soiling and sometimes damaging the same.

Another detrimental feature of the prior art grill board and the usual operation thereof is that the handling thereof deprives the operator of other uses of his hand holding the board while he removes or places items on the grill, or else a suitable place must be found to deposit the grill board when it is not in use or while items are being removed or placed on the grill. This not only wastes time but also wastes valuable operating space.

It is, therefore, an object of this invention to provide a grill board for use in conjunction with a grill wherein the normally condensed moisture on the bottom surface thereof is automatically removed.

It is another object of this invention to utilize the heat generated by the grill and the vapor removing action of a hood cooperatively disposed with the grill for removing condensed moisture from the grill board.

Yet a further object of this invention is to provide a grill board mounted in such a manner relative to the grill and a cooperating hood so that when the grill board is removed from the heated item it need not be held or wiped dry by the operator.

Another object is to provide such a grill board wherein means maintains the same in a position removed from the grill board and wherein such position the hood sweeps vapors across the grill board thereby drying the same.

Further and other objects of this invention will become apparent when the detailed description is considered in view of the following drawings wherein:

FIG. 1 is a front elevational view of an embodiment of this invention;

FIG. 2 is a side elevational view of the embodiment shown in FIG. 1 with portions thereof shown in section for added clarity;

FIG. 3 is a plan view of the grill board used with the embodiment shown in FIGS. 1 and 2;

FIG. 4 is an enlarged sectional view of a portion of the structure shown in FIG. 3 taken along the line 4—4;

FIG. 5 is a side elevational view of another method of attaching the grill board; and FIG. 6 is a perspective view of the structure shown in FIG. 5.

In a preferred embodiment of this invention, a grill is suitably supported and has disposed above the same a vapor exhausting hood. A grill board, having front and rear ends is disposed over the grill with the front end thereof adapted to project toward the front portion of the grill and the rear end thereof adjacent the rear portion of the grill. The grill board is movable between a first and second position; the first position being substantially parallel to the grill board wherein it is operative to rest upon the upper surface of items placed on the grill for heating, and the second being with the front end thereof elevated relative to the grill. The grill board is pivotally secured at its rear end to a suitable support so that it may be pivoted between its first and second positions. Means are provided to maintain the grill board in its secured position whereby vapors exhausted by the hood will sweep over the grill board thereby drying condensed moisture from the same, and additionally, since the grill board is inclined, the condensed moisture will tend to run to the rear and lower end thereof adjacent the grill where the heat radiated by the latter will also tend to dry the same.

In this manner, not only is the wiping operation by the operator dispensed with, but also, the operator need not hold the grill board or find a place to rest the same thereby freeing the operator's hands and saving storage space.

Referring now to the drawings, a grill 10 having a flat horizontal top heating surface 11 and legs 12 and 13 is suitably supported by a counter shown fragmentarily at 14 in FIG. 1 and in section in FIG. 2. The counter 14 is preferably positioned against a vertical support shown in the form of a wall 16 which wall is shown fragmentarily in FIG. 1 and in section in FIG. 2 and fixedly carries a vapor gathering hood means 18. The hood means 18 is disposed vertically above the grill 10, and is provided with a duct 20 confluent with the rear portion thereof, which duct passes through an opening 22 in the wall 16; a blower 24 is confluently disposed in the duct 20 and adapted to draw vapors into the hood 18 and eject the same from the outer end of the duct which is disposed in a suitable location.

The lateral ends 18A of the hood 18 are preferably enclosed and the lower front surface 19 thereof is provided with a plurality of filters 26 which remove impurities from the air being exhausted thereby. As shown in FIGS. 1 and 2, a plurality of items to be heated in the form of hamburger buns 28 are disposed on the top surface 11 of the grill 10 and positioned in an in-line relationship from the front 10A to the back 10B of the grill. A grill board shown generally at 30 is adapted to pressingly engage the tops of the buns 28 as shown in FIG. 1, and maintain the same in an intimate relationship with the heating surface 11 of the grill 10. A pivotal connecting means in the form of a hinge 32 is adapted to pivotally secure the rear portion 34 of the grill board 30 to the wall 16 at a level so that when the grill board is in its lower position, shown in full lines in FIG. 1 and in phantom in FIG. 2, the smooth bottom surface 36 thereof will pressingly engage the tops of the buns 28 and the grill board will be substantially parallel to the top surface 11 of the grill 10.

One portion 38 of the hinge 32 is suitably secured to the wall 16 by a plurality of screws 40, while a second portion 42 of the hinge 32 is pivotally secured to the one portion 38 and is suitably secured to the top surface 44 of the grill board 30 at the rear portion 34 thereof as by a plurality of bolts 46. It is preferred that the bolts 46 do not project below and interrupt the smooth bottom surface 36 of the grill board 30.

A manually graspable handle 48 is suitably secured to the top surface 44 of the grill board 30 at the forward end 48 thereof, so that the operator may grasp the same and lift the grill board to its raised position, shown in full lines in FIG. 2, and remove the buns 28 from under the same. Means are provided to maintain the grill board in its raised position. More particularly, a bracket 50 is fixedly secured, as by gluing as shown generally at 51, to the top surface 44 of the grill board 30 adjacent the forward end 48 thereof, which bracket is molded about and securely carries therein a permanent magnet 52.

When the grill board 30 is in its raised position, as shown in FIG. 2, the magnet 52 cooperates with and magnetically secures the grill board to the lower surface 19 of the hood 18 which, at least at the point of contact of the magnet 52, is made of magnetic attachable material.

In FIGS. 5 and 6, another type of hinge, indicated generally at 54, is provided to pivotally secure the grill board 30 to the wall 16. A back plate 56 is secured to the wall 16 by a plurality of screws 58 and has secured thereto a plurality of vertically spaced pairs of laterally spaced L-shaped pivot supports 60. A front plate 62 is secured to the top surface 44 of the grill board 30 at the rear portion 34 thereof by a plurality of bolts 46, which bolts preferably do not project below the bottom surface 36 of the grill board. The rear end of the front plate 62 terminates in a laterally extending pivot pin 64; the outer ends of the pin 64 extending beyond the plate 62 are pivotally received and supported in the pair of laterally spaced pivot supports 60 so that the grill board 30 is pivotally secured to the wall 16. The pivot pin 64 may be positioned in the desired pair of supports 60 so that the parallel height of the grill board 30 relative to the grill 10 may be adjutsed to accommodate buns, or other items to be heated, of varying thickness.

From the foregoing it is apparent that the operator can easily position the grill board 30 in its raised position wherein it is securely held, and is free to use both hands to remove and place items on the grill 10, while any condensed moisture on the grill board is dried by the vapors passing therepast and into the hood 18. Additional storage facilities are not needed for the grill board 30, and wiping material is dispensed with. Further, the problem of dropping the grill board 30 on the floor is removed.

It is to be understood that the above description of this invention is illustrative only, and that changes and modifications can be made therein without departing from the scope of this invention as defined by the following claim.

What is claimed is:

The combination with a grill having a top heating surface for heating items placed thereon and forward and rear ends of a support means disposed rearwardly of said grill and extending vertically upwardly from the level of said top surface, a hood carried by said support means and having a portion thereof extending over said grill in a vertically spaced relationship, an elongated grill board having forward and rear ends and having a width less than the width of said grill, means pivotally securing the rearward end of said grill board to said support means at a position vertically above said grill, said grill board being pivotal from a lower position substantially parallel to said grill to a raised position with its forward end raised vertically above said grill board with substantially said entire grill board disposed below said hood, handle means carried by the forward end of said grill board and being graspable for manually pivoting said grill board between its positions and securing means including a first portion carried by said hood and a second portion carried by said grill board for securing the latter in its raised position whereby vapors passing into said hood will move past said grill board and dry the same, one of the portions of said securing means being a magnetic element and the other portion being of a magnetically attractable material.

References Cited by the Examiner

UNITED STATES PATENTS

| | | | |
|---|---|---|---|
| Re. 22,228 | 12/1942 | Petersen | 126—299 |
| 312,621 | 2/1885 | Estelle | 16—133 |
| 706,643 | 8/1902 | Doppelmayr et al. | 100—233 X |
| 1,436,546 | 11/1922 | Stephens | 126—37 |
| 1,697,384 | 1/1929 | Coutu | 99—349 |
| 2,584,613 | 2/1952 | Pledger | 126—299 |
| 3,078,133 | 2/1963 | Schauer | 312—300 X |

WALTER A. SCHEEL, *Primary Examiner.*

BILLY J. WILHITE, *Examiner.*